US012601079B2

(12) United States Patent
Yuan et al.

(10) Patent No.: US 12,601,079 B2
(45) Date of Patent: *Apr. 14, 2026

(54) HIGH HEAT-RESISTANT ANTIOXIDANT SOLUTIONS FOR LITHIUM BATTERY COPPER FOIL

(71) Applicant: NAN YA PLASTICS CORPORATION, Taipei City (TW)

(72) Inventors: Ching-Yao Yuan, Taipei City (TW);
Hung-Yi Chang, Taipei City (TW);
Wei-Sheng Cheng, Taipei City (TW);
Yu-Chi Hsieh, Taipei City (TW);
Hsin-Hui Chiu, Taipei City (TW)

(73) Assignee: NAN YA PLASTICS CORPORATION, Taipei City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,972

(22) Filed: Apr. 9, 2024

(65) Prior Publication Data

US 2025/0297397 A1 Sep. 25, 2025

(30) Foreign Application Priority Data

Mar. 20, 2024 (TW) ................................. 113110232

(51) Int. Cl.
| | |
|---|---|
| *C25D 3/10* | (2006.01) |
| *C25D 3/08* | (2006.01) |
| *C25D 7/06* | (2006.01) |
| *H01M 4/62* | (2006.01) |
| *H01M 4/66* | (2006.01) |

(52) U.S. Cl.
CPC ................. *C25D 3/10* (2013.01); *C25D 3/08* (2013.01); *C25D 7/0614* (2013.01); *H01M 4/628* (2013.01); *H01M 4/661* (2013.01)

(58) Field of Classification Search
None
See application file for complete search history.

(56) References Cited

FOREIGN PATENT DOCUMENTS

| | | | | |
|---|---|---|---|---|
| CN | 104342746 | | 2/2015 | |
| CN | 110438531 | A * | 11/2019 | ............... C25D 1/04 |
| CN | 110923755 | A * | 3/2020 | ............... C25D 1/04 |
| CN | 111155159 | | 5/2020 | |
| CN | 112048721 | A * | 12/2020 | ............. C23F 11/10 |
| JP | 2002180267 | | 6/2002 | |
| JP | 4274628 | B2 * | 6/2009 | ......... C07F 15/0053 |
| JP | 2013206555 | | 10/2013 | |
| JP | 2017191681 | | 10/2017 | |
| JP | 2018109227 | | 7/2018 | |
| JP | 7680519 | | 5/2025 | |
| TW | 201228818 | | 7/2012 | |
| TW | I476985 | | 3/2015 | |
| TW | 202300707 | | 1/2023 | |

OTHER PUBLICATIONS

Chen et al. CN 110923755 A, machine translation (Year: 2020).*
Peng et al. CN 110438531 A, machine translation (Year: 2019).*
Nomura et al. JP 4274628 B2, machine translation (Year: 2009).*
Machine translation of Wang et al. CN 112048721 A (Year: 2020).*
"Office Action of Taiwan Counterpart Application", issued on Nov. 19, 2024, p. 1-p. 7.
"Office Action of Japan Counterpart Application", issued on Jun. 12, 2025, p. 1-p. 5.

* cited by examiner

*Primary Examiner* — Wojciech Haske
(74) *Attorney, Agent, or Firm* — JCIPRNET

(57) ABSTRACT

The invention provides a high heat-resistant antioxidant solution for lithium battery copper foil, including hexavalent chromium and organic compounds containing heteroatoms, and the heteroatoms include N, O, S or P.

3 Claims, 1 Drawing Sheet

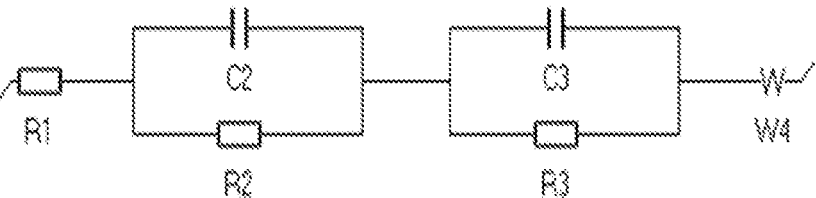

HIGH HEAT-RESISTANT ANTIOXIDANT SOLUTIONS FOR LITHIUM BATTERY COPPER FOIL

CROSS-REFERENCE TO RELATED APPLICATION

This application claims the priority benefit of Taiwan application serial no. 113110232, filed on Mar. 20, 2024. The entirety of the above-mentioned patent application is hereby incorporated by reference herein and made a part of this specification.

BACKGROUND

Technical Field

The invention relates to an antioxidant solution for lithium battery copper foil, and in particular, to a high heat-resistant antioxidant solution for lithium battery copper foil.

Description of Related Art

The traditional anti-oxidation treatment of lithium battery copper foil is mostly to put the copper foil into a hexavalent chromium solution for electroplating, so that a passivation layer is formed on the surface of the copper foil to prevent oxidation. Its heat-resistant temperature is about 150° C. To reach a temperature higher than 210° C., nickel, zinc or other metal elements and chromium are usually added to form a heat-resistant composite metal layer.

With the vigorous development of applications such as electric vehicles, users' performance requirements for lithium batteries are also increasing. In order to improve the safety of lithium battery use, to avoid overcharging, the reactivity between the electrode and the electrolyte increases and heat is released rapidly, causing the copper foil to fall off due to high-temperature oxidation, resulting in the formation of lithium dendrites, rupture of the isolation film, and ultimately battery explosion, it is necessary to increase the heat resistance temperature of copper foil.

However, the conventional technology adds a variety of metal elements to the hexavalent chromium plating solution to form a composite metal anti-oxidation layer. Although the heat-resistant temperature can be improved, adding too many heavy metals not only increases the cost, but also increases the cost of sewage treatment. The increased difficulty will have an impact on the battery performance of the copper foil.

Based on the above, developing a high heat-resistant antioxidant solution for lithium battery copper foil, which can effectively increase the heat-resistant temperature and simultaneously solve the cost increase and sewage treatment problems, is an important topic currently required for research.

SUMMARY

The invention provides a high heat-resistant antioxidant solution for lithium battery copper foil, which can effectively increase the heat-resistant temperature while solving the problems of cost increase and sewage treatment.

The high heat-resistant antioxidant solution for lithium battery copper foil of the invention includes hexavalent chromium and organic compounds containing heteroatoms, and the heteroatoms include N, O, S or P.

In an embodiment of the invention, based on a total weight of the antioxidant solution for the lithium battery copper foil, a content of the hexavalent chromium is 50 ppm to 1500 ppm, and a content of the organic compounds containing heteroatoms is 3000 ppm to 60000 ppm.

In an embodiment of the invention, a sources of the hexavalent chromium includes chromium trioxide, chromates and dichromates.

In an embodiment of the invention, the organic compounds containing heteroatoms include benzotriazole, 2-thiol benzotriazole, nitrogen-containing azoles, hydroxyethylene diphosphate, aminotrimethylenephosphonic acid, sodium ethylenediamine tetramethylenephosphate, ethanol diamine tetraacetic acid, sodium gluconate, sodium potassium tartrate or water-soluble siloxane.

In an embodiment of the invention, the nitrogen-containing azoles include aminotriazole or aminotetrazole.

Based on the above, the invention provides a high heat-resistant antioxidant solution for lithium battery copper foil. By adding organic compounds containing heteroatoms, it forms coordination bonds with the empty orbitals of copper, so that a dense anti-oxidation layer is formed on the surface of the copper foil to prevent oxidation and discoloration of the copper foil at a high temperature of 210° C.

BRIEF DESCRIPTION OF THE DRAWINGS

The FIGURE is an equivalent circuit diagram used for fitting.

DESCRIPTION OF THE EMBODIMENTS

Embodiments of the disclosure will be described in details below. However, these embodiments are illustrative, and the disclosure is not limited thereto.

Herein, a range indicated by "one value to another value" is a general representation which avoids enumerating all values in the range in the specification. Therefore, the description of a specific numerical range covers any numerical value within the numerical range and the smaller numerical range bounded by any numerical value within the numerical range, as if the arbitrary numerical value and the smaller numerical range are written in the specification.

The invention provides a high heat-resistant antioxidant solution for lithium battery copper foil, including hexavalent chromium and organic compounds containing heteroatoms, and the heteroatoms include N, O, S or P. Based on the total weight of the antioxidant solution for the lithium battery copper foil, the content of hexavalent chromium is, for example, 50 ppm to 1,500 ppm, and the content of the organic compounds containing heteroatoms is, for example, 3,000 ppm to 60,000 ppm.

In the present embodiment, the source of hexavalent chromium may include chromium trioxide, chromate and dichromate. The organic compounds containing heteroatoms may include benzotriazole or its derivatives, 2-thiol benzotriazole, nitrogen-containing azoles, hydroxyethylene diphosphate, aminotrimethylenephosphonic acid, sodium ethylenediamine tetramethylenephosphate, ethanol diamine tetraacetic acid or its derivatives, sodium gluconate, sodium potassium tartrate or water-soluble siloxane, and nitrogen-containing azoles may include aminotriazole or aminotetrazole.

The invention also provides a high heat resistance and anti-oxidation treatment method for lithium battery copper foil, using the above-mentioned high heat-resistant antioxidant solution for lithium battery copper foil, including the following steps. First, after the raw electrolytic copper foil is washed and air-dried, it is impregnated or electroplated with the high heat-resistant antioxidant solution of the invention. The impregnation time is, for example, 1 second to 20 seconds, and the electroplating conditions are, for example, 0.1 ASD to 4 ASD. Afterwards, it is squeezed, air-dried, and rolled up. In this embodiment, the thickness of the organic antioxidant layer formed on the surface of the copper foil is, for example, 10 nm to 300 nm. The organic antioxidant layer can be formed on two opposite surfaces of the copper foil.

After the copper foil has completed the anti-oxidation treatment, it is subjected to a heat resistance test. The copper foil is placed in a circulating oven at different temperatures and baked for 10 minutes, and the highest temperature at which the color difference ($\Delta E$) after baking does not exceed 8 is regarded as its heat-resistant temperature.

The measurement of color difference ($\Delta Eab$) is to use a spectrophotometer to measure the L, a, and b values of the copper foil before and after baking, and calculate it by the formula below.

$$\Delta E_{ab} = \sqrt{(L_2 - L_1)^2 + (a_2 - a_1)^2 + (b_2 - b_1)^2}$$

The lithium battery copper foil treated with the formula of the invention can be used at high temperatures of 180° C. to 250° C. without oxidative discoloration.

Hereinafter, the above-mentioned high heat-resistant anti-oxidant solution for lithium battery copper foil of the invention will be described in detail through experimental examples. However, the following experimental examples are not intended to limit the invention.

EXPERIMENTAL EXAMPLE

In order to prove that the copper foil treated with the high heat-resistant antioxidant solution of the invention has better lithium battery performance than the traditional hexavalent chromium formula, the experimental example is specially made below.

Example 1

After cleaning the plating solution on the raw foil with pure water and air-drying, it is immersed in an antioxidant solution containing 390 ppm of hexavalent chromium and 7000 ppm of organic compounds containing heteroatoms for 8 seconds, in which the hexavalent chromium comes from potassium dichromate and organic compounds containing heteroatoms include 5-aminotetrazole and disodium ethylenediaminetetraacetate, which are electroplated at a current density of 0.17 ampere/square decimeter (A/dm²) for 0.5 seconds to form a heat-resistant and anti-oxidation layer on the surface of the copper foil. After testing, it was found that its heat resistance is 190° C. for 10 minutes.

Example 2

After cleaning the plating solution on the raw foil with pure water and air-drying, it is immersed in an antioxidant solution containing 390 ppm of hexavalent chromium and 16000 ppm of organic compounds containing heteroatoms for 8 seconds, in which the hexavalent chromium comes from potassium dichromate and organic compounds containing heteroatoms include 5-aminotetrazole, disodium ethylenediaminetetraacetate and ethylenediaminetetramethylenephosphate. Electroplating was performed at a current density of 0.17 A/sq. decimeter (A/dm²) for 0.5 seconds to form a heat-resistant and anti-oxidation layer on the surface of the copper foil. After testing, it was found that its heat resistance is 210° C. for 10 minutes.

Example 3

After cleaning the plating solution on the raw foil with pure water and air-drying, it is immersed in an antioxidant solution containing 390 ppm of hexavalent chromium and 56000 ppm of heteroatom organic matter for 8 seconds, in which the hexavalent chromium comes from potassium dichromate and organic compounds containing heteroatoms include 5-aminotetrazole and potassium sodium tartrate. Electroplating was performed at a current density of 0.17 A/dm² for 0.5 seconds to form a heat-resistant and anti-oxidation layer on the surface of the copper foil. After testing, it was found that its heat resistance is 250° C. for 10 minutes.

Comparative Example 1

After cleaning the plating solution on the raw foil with pure water and air-drying, it is immersed in an antioxidant solution of 988 ppm of hexavalent chromium for 8 seconds, in which the hexavalent chromium comes from potassium dichromate, using 0.17 ampere/square decimeter (A/dm²) current density electroplating for 0.5 seconds forms a heat-resistant and anti-oxidation layer on the surface of the copper foil. After testing, it was found that its heat resistance is 150° C. for 10 minutes.

Based on the above heat resistance test, it can be known that compared to the Comparative Example 1 using the traditional hexavalent chromium formula, the heat resistance temperature of Examples 1 to 3 treated with the antioxidant liquid of the invention is increased, so the heat resistance is better.

Lithium Copper Foil Battery Performance Comparison

The lithium battery copper foil of the aforementioned Example 1 and Comparative Example 1 was matched with commercially available negative electrode materials to make a negative electrode, and was assembled into a CR2032 button battery. The electrical performance such as AC impedance and cycle life were analyzed.

The button battery production process is as follows:

First, prepare the negative electrode slurry, whose solid phase composition includes 92 wt % graphite (medium carbon FMGP-A), 5% polyvinylidene fluoride (PVDF 5130) and 3% conductive carbon black (Super P), with NMP as the solvent, so as to make a uniform slurry with a solid content of 45%. Next, the negative electrode slurry was coated on the lithium battery copper foil with a wet film thickness of 200 μm and a coating speed of 2 mm/s. After the coating is completed, it is initially dried in a 60° C. oven and then vacuum dried in a 120° C. oven. The dried negative electrode is rolled until the compacted density is 1.3 (g/cm³), and cut into circular electrode pieces with a diameter of 13 mm. Next, assemble the CR2032 button battery, place the lower cover, lithium metal sheet, PE isolation film, negative electrode sheet, gasket, and reed in order from bottom to top, and inject the electrolyte 1M LiPF₆ in EC:DEC (1:1). Finally, cover the upper cover, pressurize and seal with a sealing machine to complete the battery assembly.

After the battery is assembled, it needs to be activated, and three charge and discharge cycles are performed with a current of 0.1 C. The discharge mode is constant current-constant voltage (CC-CV), the charging mode is constant current, and the operating voltage range is 10 mV. –2V.

Conduct AC impedance analysis on the batteries of Comparative Example 1 and Example 1, and fit them with the equivalent circuit diagram (the FIGURE). From the results in Table 1 below, it can be seen that the charge transfer impedance ($R_3$) of Example 1 is better than Comparative Example 1.

TABLE 1

| AC impedance fitting data of button battery | | | | |
| --- | --- | --- | --- | --- |
| | $R_1$ | $R_2$ | $R_3$ | $R_{total}$ |
| Comparative Example 1 | 1.656 | 9.459 | 9.887 | 21.002 |
| Example 1 | 1.679 | 4.306 | 9.187 | 15.172 |

The batteries of Comparative Example 1 and Example 1 are subjected to a cycle life test, and a charge and discharge cycle is performed with a current of 1 C, in which the discharge mode is constant current-constant voltage (CC-CV), the charging mode is constant current, and the operating voltage range is 10 mV-2V. When the capacity of a lithium battery drops to 80% of its initial capacity, the number of cycles is the cycle life. The test results are shown in Table 2 below.

TABLE 2

| Cycle life test | | |
| --- | --- | --- |
| | Gram capacity (mAh/g) | Cycle life (times) |
| Comparative Example 1 | 319.73 | 1124 |
| Example 1 | 321.64 | 972 |

In summary, the invention provides a high heat-resistant antioxidant solution for lithium battery copper foil. By adding organic compounds containing heteroatoms, it forms coordination bonds with the empty orbitals of copper, so as to form a dense anti-oxidation layer on the surface of the copper foil. The anti-oxidation layer prevents the copper foil from oxidative discoloration at a high temperature of 210° C., which effectively increasing the heat-resistant temperature. As a result, the copper foil treated with the antioxidant solution of the invention has better lithium battery performance than the traditional hexavalent chromium formula. In addition, the high heat-resistant antioxidant solution of the invention includes organic compounds containing heteroatoms, which replaces heavy metals in the conventional technology. Therefore, it not only effectively increases the heat-resistant temperature, but also solves the cost increase and sewage treatment problems at the same time.

What is claimed is:

1. A antioxidant solution for lithium battery copper foil, comprising:

hexavalent chromium; and organic compounds containing heteroatoms, wherein the heteroatoms include N, O, S or P, wherein based on a total weight of the antioxidant solution for the lithium battery copper foil, a content of the hexavalent chromium is 50 ppm to 1500 ppm, and a content of the organic compounds containing heteroatoms is 3000 ppm to 60000 ppm, wherein the organic compounds containing heteroatoms include 2-thiol benzotriazole, nitrogen-containing azoles, hydroxyethylene diphosphate, aminotrimethylenephosphonic acid, sodium ethylenediamine tetramethylenephosphate, ethanol diamine tetraacetic acid, sodium gluconate, sodium potassium tartrate or water-soluble siloxane.

2. The antioxidant solution for lithium battery copper foil according to claim 1, wherein a source of the hexavalent chromium includes chromium trioxide, chromates and dichromates.

3. The antioxidant solution for lithium battery copper foil according to claim 1, wherein the nitrogen-containing azoles include aminotriazole or aminotetrazole.

* * * * *